United States Patent [19]
Wischermann

[11] Patent Number: 5,519,453
[45] Date of Patent: May 21, 1996

[54] METHOD OF ELIMINATING INTERFERNCE SIGNALS FROM VIDEO SIGNALS

[75] Inventor: Gerhard Wischermann, Weiterstadt, Germany

[73] Assignee: U. S. Philips Corporation, New York, N.Y.

[21] Appl. No.: 285,268

[22] Filed: Aug. 3, 1994

[30] Foreign Application Priority Data

Aug. 6, 1993 [DE] Germany ............ 43 26 390.9

[51] Int. Cl.⁶ .................................................. H04N 5/213
[52] U.S. Cl. ............................................ 348/620; 348/619
[58] Field of Search .................................. 348/701, 702, 348/609, 610, 612, 618, 619, 620, 621, 451, 452, 669, 670, 622, 623, 627, 909, 607; H04N 5/21, 5/213, 5/217

[56] References Cited

U.S. PATENT DOCUMENTS

| | | | |
|---|---|---|---|
| 5,148,278 | 9/1992 | Wischermann | 358/167 |
| 5,191,419 | 3/1993 | Wischermann | 348/620 |
| 5,384,865 | 1/1995 | Leveridge | 348/618 |
| 5,404,178 | 4/1995 | Kondo et al. | 348/618 |

FOREIGN PATENT DOCUMENTS

| | | | |
|---|---|---|---|
| 4319342 | 6/1994 | Germany. | |
| 2202706 | 9/1988 | United Kingdom | H04N 5/213 |
| 2251353 | 7/1992 | United Kingdom | H04N 5/213 |

*Primary Examiner*—James J. Groody
*Assistant Examiner*—Michael H. Lee
*Attorney, Agent, or Firm*—Bernard Franzblau

[57] ABSTRACT

A method of eliminating interference signals from video signals by motion-adaptive filtering, in which method first a motion signal-dependent transversal filtering and subsequently a median filtering is performed.

20 Claims, 3 Drawing Sheets

45: $G_{xy} = (G > SG) \cdot (M_{xy} < SM)$

47: $S_y = G_{xy} \cdot G_{yz} \cdot (1 + Z^{-1} + Z^{-2})$

METHOD OF ELIMINATING INTERFERNCE SIGNALS FROM VIDEO SIGNALS

BACKGROUND OF THE INVENTION

1. Field of the Invention

This invention relates to a method of eliminating interference signals from video signals by means of motion-adaptive filtering.

2. Description of the Related Art

For the purpose of eliminating interference signals, recursive filtering, transversal filtering and median filtering are generally used in video technology. The recursive and transversal filtering methods are satisfactory as linear filtering methods for reducing equally distributed (white) noise, while the non-linear median filtering method has advantages in the elimination of impulsive noise. In practice, recursive filtering is often preferred to transversal filtering due to the smaller number of components required and the higher noise reduction, although a linear phase and a constant group delay time are obtained with the transversal filtering method. Circuit structures for linear filters for eliminating interference signals are well known. To characterize median filters, the associated filter window will be described. This window indicates the number and location of samples of a function to be filtered. When (digital) video signals are used, the filtering operation can be performed in all three dimensions (horizontal, vertical and temporally). Such median filters are described in DE-A-40 01 552, corresponding to U.S. Pat. No. 5,148,278. A drawback of this implementation is that the filter window is constant. For example, upon motion, artefacts in the form of loss of sharpness and aliasing may occur.

SUMMARY OF THE INVENTION

It is therefore an object of the present invention to achieve an optimum adaptation to distinct interference structures in a method for eliminating interference signals from video signals, in which method motion artifacts are minimized and interference pulses of a high amplitude also are completely eliminated.

This object is achieved in that the video signals and video signals derived therefrom by picture-sequential delay are evaluated dependent upon the motion signal, in that these video signals, evaluated and derived from two consecutive pictures (X, Y and Y, Z), are added together and applied to a median filter, in that further picture- sequentially delayed unevaluated video signals (Y) are derived and in that the video signals thus obtained are subsequently also median-filtered.

The method according to the invention has the advantage that both a linear and a non-linear noise reduction can be achieved with a single hardware architecture. Consequently, equally distributed, white noise as well as impulsive noise can be effectively suppressed. Moreover, a better dynamic noise reduction than is achieved, for example, with recursive filtering is realized, because also a change of scenes leads to a noise reduction without any interruption due to the possibility of averaging the video signals of two consecutive images. Moreover, another advantage is that there is less smear than with a recursive filter.

It is particularly advantageous that an adjustable median filtering is achieved by continuous filter window setting. It is furthermore advantageous that the motion-adaptive median filtering does not lead to any or only very small artefacts.

BRIEF DESCRIPTION OF THE DRAWINGS

Embodiment of the method and apparatus are shown in the drawings and will hereinafter be described in greater detail. In the drawings.

DESCRIPTION OF THE PREFERRED EMBODIMENT

Figure 1:
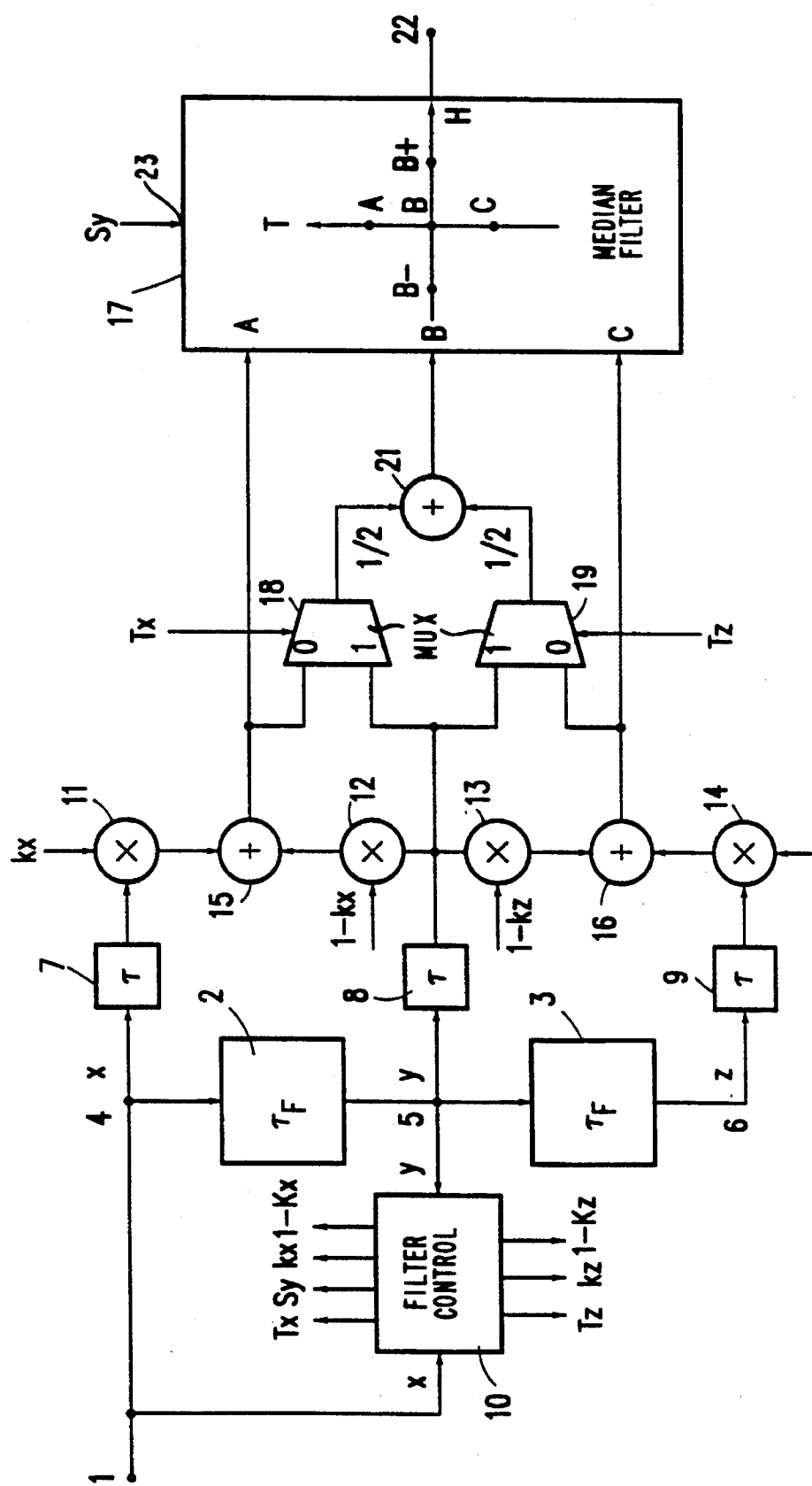
FIG. 1 shows a circuit for performing the method according to the invention.

In the circuit for eliminating interference signals shown in FIG. 1, the (digital) video signals to be filtered are applied via terminal 1 and delayed by one frame period in two delay devices 2 and 3 so that the signals of three consecutive pictures X, Y, Z are simultaneously present at points 4, 5, 6. These video signals are now supplied to delay members 7, 8, 9 for the purpose of delay matching. The input video signal of the picture X as well as the video signal delayed by one frame period of the picture Y are also applied to an input of a filter control stage 10 in which the control signals kx, (1−kx), kz, (1−kz), Tx, Tz and Sy required for the operation of the filter circuit are generated.

The output signal of the delay member 7 is applied to a multiplier 11 whose control input receives the factor signal kx derived in known manner from the motion signal. A video signal kx*X can thus be derived at the output of the multiplier 11. The output signal of the delay member 8 is applied both to a multiplier 12, whose control input receives the factor signal (1−kx), and to a multiplier 13, whose control input receives the factor signal (1−kz). A video signal (1−kx)*Y can thus be derived at the output of the multiplier 12 and a video signal (1−kz)*Y can thus be derived from the output of the multiplier 13. The output signal of the delay member 9 is applied to a multiplier 14, whose control input receives the factor signal kz. A video signal kz*Z can thus be derived at the output of the multiplier 14.

The signals kx*X and (1−kx)*Y are applied to inputs of a first adder stage 15, while the signals kz*Z and (1−kz)*Y are applied to inputs of a second adder stage 16. A signal kx*X+(1−kx)*Y can thus be derived from the output of the first adder stage 15, which signal is applied to the first input A of a median filter 17 and to the first input of a multiplexer 18. A signal kz*Z+(1−kz)*Y can thus be derived from the output of the second adder stage 16, which signal is applied to the third input C of the median filter 17 and to the first input of a further multiplexer 19.

The second inputs of the multiplexers 18 and 19 are connected in common to the output of the delay member 8. The outputs of the multiplexers 18 and 19 are connected to respective inputs of a third adder stage 21 in which the mean value of the input signals is generated by signal halving and addition. A signal 0.5 (kx*X+(1−kx)*Y)+0.5 (kz*Z+(1−kz)*Y) can thus be derived at the output of the third adder stage 21, which signal is applied to the second input B of the median filter 17. The median filter 17 is a two-dimensional (horizontal and temporal) filter whose inputs A, B, C correspond to the points in the filter window shown, the points B− and B+ being generated by pixel delay in filter 17. A video signal which is free of interference signals can then be derived at the output 22 of the median filter 17.

In normal operation of the filter arrangement, the multiplexers 18 and 19 are switched to the position "0" by the switching signals Tx and Tz so that the signals from the outputs of the adder stages 15 and 16 reach the first inputs of the multiplexers 18 and 19. The coefficients kx and kz are controlled by the motion detector (shown in FIG. 2). If there is no motion, kx and kz are identical and correspond to the preselected degree of noise reduction.

When, for example, it is assumed that kx=kz=0.5, a video signal with 0.5*X+0.5*Y occurs at the input A of the median filter 17, which corresponds to a 1-1-filter. A video signal with 0.25*X+0.5*Y+0.25*Z then occurs at the input B of the median filter 17, which corresponds to a 1-2-1-filter. A video signal with 0.5*Y+0.5*Z is then present at the input C of the median filter 17, which corresponds to a 1-1-filter. The signals at A and C are thus reduced in noise by 3 dB via a 1-1-filter and the signal at the input B is improved in S/N ratio by 4.2 dB via a 1-2-1-filter. The median filtering via A, B, C and B−, B+ yields an overall noise reduction of approximately 5 dB. Without the additional horizontal median filtering via B− and B+, the reduction would be limited to 4.2 dB in that the signal at B would be selected with the lowest noise. The horizontal filtering does not lead to aliasing for stationary pictures because the value B to be filtered is supported by the values A and C.

When them is motion, the motion detector fades over the values A, B and C to Y by means of kx and kz. Moreover, the central value B, which consists of 50% of Y in the above-mentioned example, is supported by the horizontal neighbors B− and B+ upon motion, which allows a softer use of the motion detector and hence a higher dynamic noise reduction.

The range of values for kx and kz is suitably between 0 and 2/3. At kx=kz=2/3 the largest noise reduction is achieved because then a 1-1-1 filtered signal is present at the input B (S/N ratio improvement of 4.7 dB). The subsequent two-dimensional median filtering increases this value to 6.5 dB.

Impulse noise interferences cannot be reduced by the linear filtering means, but with the median filter 17. For this purpose an interference signal control pulse is derived via a corresponding circuit of the motion detector, which control pulse sets the switching signals Tx and Tz dynamically to 1 and thus switches the multiplexers 18 and 19 to position 1, and controls the coefficients kx and kz dynamically at 1. If an interference pulse occurs in one of the pictures X, Y or Z, the multiplexer 18 is set to position 1 by means of the switching signal Tx=1, the multiplexers 18 and 19 are set to position 1 by means of the switching signals Tx and Tz, or the multiplexer 19 is set to position 1 by means of the switching signal Tz, respectively.

When interference pulses occur in a picture, only the video signals of this picture are passed on to the corresponding input of the median filter 17, i.e. for interference pulses in picture X the video signals of the picture X are applied to the input A, but the video signals of pictures Y and Z are applied to the input B and the input C, respectively. Thus an interfered picture only occurs at an input A or B or C of the median filter 17 so that the interference can be completely suppressed by the median filtering operation. For the case where a plurality of pixels in a sequence is interfered in the horizontal direction (for example "dropout" in magnetic recording apparatuses), the horizontal median filtering is dynamically switched off. This is effected via the signal Sy at the input 23, which masks the pixels B− and B+ and lowers the rank of the median filter by 1.

In a further selectable mode of operation of this circuit for eliminating interference, which is useful for larger, i.e. more extensive pulse interferences, the median filter 17 is motion-adaptively operated in an adjustable manner. In this mode of operation it always holds that Tx=Tz=1, i.e. the multiplexers 18 and 19 are switched to position 1. The same signal values as in the normal operation mode are present at the inputs A and C of the median filter 17, whereas the video signal of picture Y is always present at the input B. In this configuration the temporal component of the median filtering can be adjusted via kx and kz.

If kx=kz=0, the median filter 17 is completely switched off because only the video signal of the picture Y is present at all inputs A, B and C. At a value of kx=kz approximating 1, the filter action will be maximal because the video signals of each picture X, Y and Z are present at each of the inputs A, B and C, respectively. The preselected value for kx and kz may be faded more or less rapidly towards 0 when there is motion, dependent on how much filter action is desired. The total elimination of interference pulses is only possible at kx=kz=1. To achieve a 100% elimination of interference pulses at a moderate median filtering (for example kx=kz= 0.5), the k factors are dynamically forced to 1 via the interference pulse control signals Bx and Bz (FIG. 2).

If there is pulse interference in picture X or in picture Z, it only has an effect on an input A or C, respectively, of the median filter 17 and may therefore be filtered out without any additional measures. Consequently, a reaction concerning the k factor is thus only necessary for an interference pulse in the picture X. A stronger action of the median filter 17 is achieved when kx=kz is preselected to be 1 beforehand and not just when the interference pulse detector signalizes this, because it can only identify interferences as such up to a given degree.

Since, as is known, the motion detector responds to picture-picture differences, a larger scratching noise or "dropout" may also trigger the motion detector, which will then lead to an unwanted decrease of the k factors. To avoid this, the influence of the motion signal on kx and kz can be reduced or even switched off in the strongest reduction stage, because, due to the two-dimensional median filtering, the value B to be filtered is supported by its horizontal neighbouring pixels B− and B+ when there is motion. For a horizontally extending interference the horizontal filtering should of course be switched off by masking the pixels B− and B+ with the signal Sy.

Figure 2:
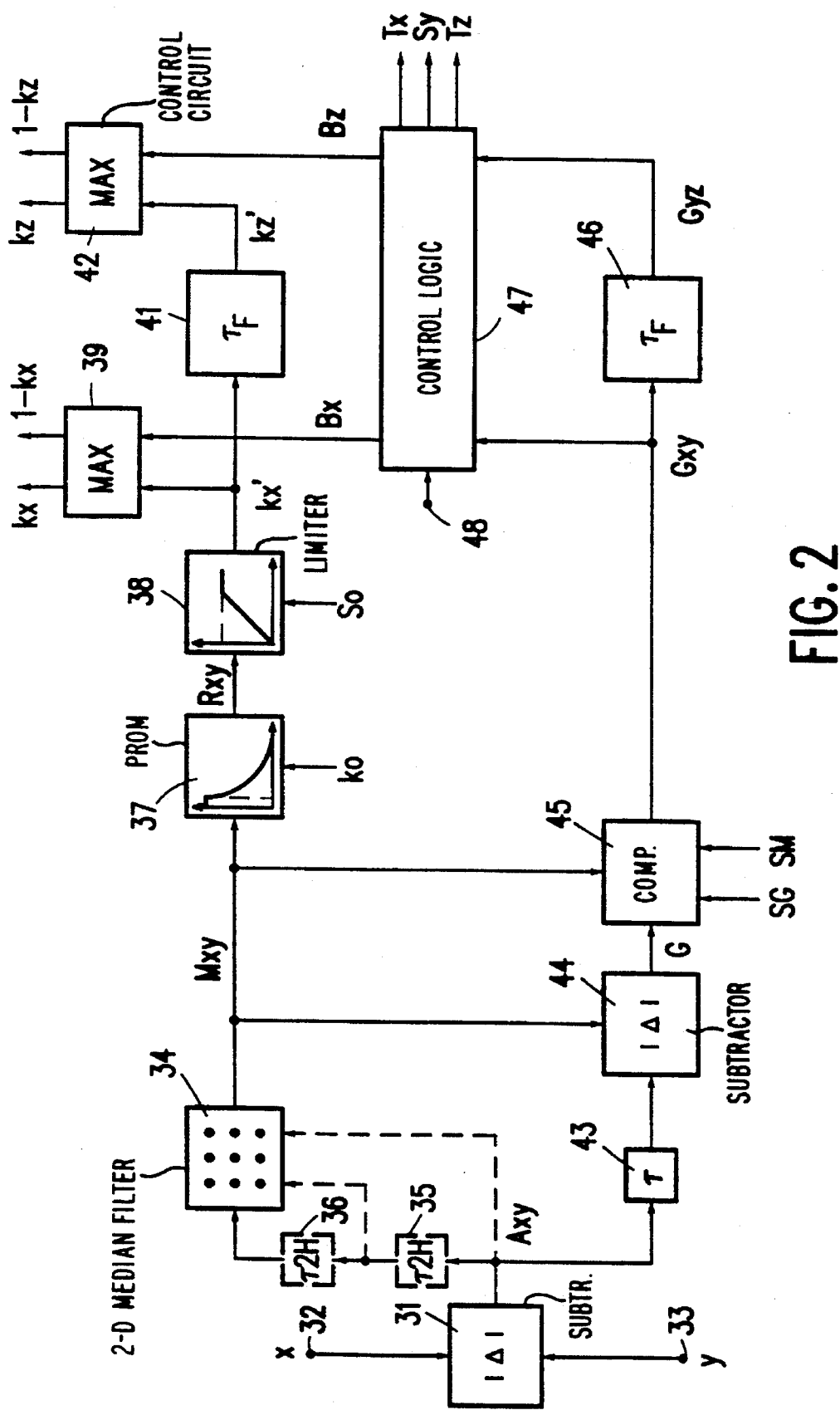
FIG. 2 shows a block diagram of the filter control shown in FIG. 1.

The block diagram of the filter control unit (10 in FIG. 1) is shown in FIG. 2 and comprises a motion detector, already proposed in DE-A-43 19 342, corresponding to U.S. patent application Ser. No. 08/253,522, filed Jun. 3, 1994 (Atty. docket PHD 93-082), for generating the factors k and (1−k), as well as a control logic for generating the switching signals Tx, Tz and Sy.

The motion detector essentially comprises an absolute value subtracter 31 whose inputs receive the undelayed video signal of the picture X (terminal 32) and the video signal of the picture Y (terminal 33) delayed by one frame period. The output of the device 31 is connected to a two-dimensional median filter 34 operating as a low-pass filter, with which a substantially interference-free motion signal is generated. With a filtering through three lines each to three pixels, up to four interfered pixels within the filter window can be suppressed. A completely interfered line can be restored in this manner. Even two consecutive faulty lines can be suppressed by means of a simple trick, in that only every second line is filtered in the vertical direction. For this purpose the signal Axy is applied to the inputs of the median filter 34 via two 2-line delays 35, 36. The output signal Mxy of the median filter 34 indicates by which value the video signal of the picture X differs from the delayed picture Y.

In order to prevent smear of the previous picture Z at a deviation of the signal Mxy in the 1-1 filtered signal kx*X(1−kx)*Y, the factor k should be reduced reciprocally by 1/Mxy. This function is stored in a programmable read-only memory 37 (PROM). An adjustable threshold value k0 for suppressing residual noise components in the motion signal is also stored in the Table. The value Rxy thus obtained is limited to the value of the desired static reduction factor in a subsequent limiter 38.

The factor kx' produced at the output of the limiter 38 is now applied to a control stage 39, from whose output the factor kx can be derived which can be controlled to the maximum value 1 by means of the interference pulse control signal Bx, which is also applied to the control stage. Moreover, the factor (1−kx) can be derived from a further output of this stage 39. By means of a frame delay 41 the factor kz', which is applied to a further control stage 42, is derived from the factor kx'. The factor kz can be derived at its output, which factor can be equally set to 1 by means of a further interference pulse control signal Bz. Moreover, the factor (1−kz) can be derived from a further output of the stage 42.

The signal Axy is further applied to an absolute value subtracter 44 via a delay member 43. Since the median filter 34 filters the interference, pulses from the motion signal, these interference pulses themselves can be isolated by the difference between the filter output signal Mxy and the delayed input signal Axy. The value G is then proportional to the value of the interference pulse. This signal is compared with the output signal of the median filter Mxy in the subsequent comparator 45. Moreover, a threshold signal Sg and a threshold signal Sm are applied to the comparator 45. The comparator checks whether the interference pulse is above a predeterminable threshold SG and whether the motion signal is below a predeterminable threshold SM.

The interference pulse indication signal Gxy produced at the output of the comparator 45 is applied directly and via a picture delay 46 (Gyz) to the two inputs of a control logic circuit 47. The signal Gxy characterizes the interferences in the picture X or Y, while the signal Gyz indicates interferences in the picture Y or Z. The interference pulse indication signals Gxy and Gyz cause the median filtering to be switched on in the main signal path (FIG. 1) only when there is no more motion or only little motion in the picture. The known motion artefacts which occur in non-adaptive median filtering are then avoided. The switching signals Tx, Tz and Sy and the signals Bx and Bz are taken from the control logic circuit 47. By means of a signal which can be manually applied to terminal 48, the normal operating mode—as described hereinbefore—or the different operating mode for more extensive interference pulses can be selected. In the first-mentioned case, it holds that Tx=Gxy=Bx and Tz=Gyz=Bz, and in the second case, it holds that Tx=Tz=1 and Bx=Bz=Gxy*Gyz.

Figure 3:
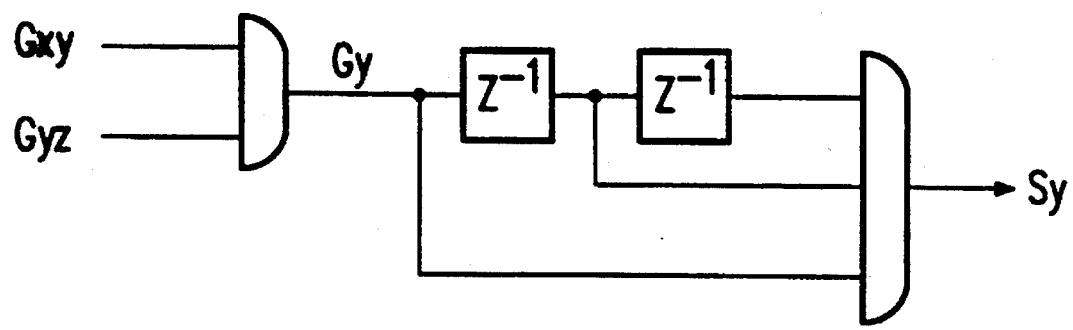
FIG. 3 shows a circuit of the H interference pulse detector.

FIG. 3 shows a logic circuit for generating the switching signal Sy. The signals Gxy and Gyz are applied to the input of this circuit and it is checked whether more than two pixels are consecutively interfered in the H direction, whereupon the pixels B− and B+ are masked at the input B of the median filter 17. The combination Gy=Gxy*Gyz characterizes an interference pulse in the picture Y. If the signal Gy is "high" in a sequence of three pixels, the horizontal median filtering will be switched off by means of Sy.

I claim:

1. A method of eliminating interference signals from video signals by means of motion-adaptive filtering, comprising the following steps: evaluating the video signals and video signals derived therefrom by picture-sequential delay dependent upon a motion signal, adding together video signals evaluated and derived from two consecutive pictures (X, Y and Y, Z) to produce evaluated and added video signals, deriving further picture-sequentially delayed unevaluated video signals (Y), and subsequently median-filtering the evaluated and added video signals and the derived further unevaluated video signals.

2. A method as claimed in claim 1, further comprising: averaging the evaluated and added video signals to derive further averaged video signals.

3. A method as claimed in claim 1, which further comprises: applying the evaluated and added video signals, as well as the unevaluated video signals after averaging or the further averaged video signals to a median filter, and deriving interference signal-free video signals at an output of the median filter.

4. A method as claimed in claim 1, which includes median-filtering the video signals temporally and horizontally.

5. A method as claimed in claim 4, which further comprises switching off the horizontal median filtering.

6. A method as claimed in claim 3, further comprising: applying to the median filter, dependent upon pulse interferences occurring in the picture, unevaluated video signals instead of the further averaged video signals.

7. A circuit for eliminating interference signals from video signals by means of motion-adaptive filtering, wherein said circuit comprises: a plurality of picture memories to which said video signals are applied, said plurality of picture memories having outputs for providing first and second picture-sequentially delayed video signals (Y, Z), outputs of the plurality of picture memories being connected to respective multipliers having control inputs which receive a respective motion signal-dependent factor (k and (1−k)), outputs of the multipliers of said first and second picture-sequentially consecutive video signals being respectively connected to inputs of respective adder stages, said respective adder stages having respective outputs for providing evaluated and added video signals, the outputs of the adder stages being connected to respective first inputs of a first and a second multiplexer and to respective inputs (A, C) of a median filter, the first picture-sequentially delayed video signals (Y) being applied to respective second inputs of the first and second multiplexers, and outputs of the multiplexers being connected to an averaging stage having an output connected to a further input (B) of the median filter.

8. A circuit as claimed in claim 7, further comprising a motion detector for generating switching signals (Tx, Tz) for switching the first and second multiplexers in addition to the motion signal dependent factor signals (k, (1−k)).

9. A circuit as claimed in claim 8, wherein the switching signals (Tx, Tz) for switching the first and second multiplexers are either automatically generated when pulse interferences occur or are generated by manually adjusting a control logic circuit included in the motion detector.

10. A method as claimed in claim 2, which further comprises: applying the evaluated and added video signals and the unevaluated video signals after averaging or the further video signals to a median filter, and deriving interference signal-free video signals at an output of the median filter.

11. A method as claimed in claim 10, further comprising:

applying to the median filter, dependent upon pulse interferences occurring in the picture, the unevaluated video signals instead of the further signals derived by averaging.

12. A method of reducing noise in a video signal which comprises:

deriving at least one motion signal, performing a motion signal dependent transversal filtering of the video signal which comprises;

deriving from said video signal a delayed unevaluated video signal delayed by one picture period, evaluating the video signal and the delayed video signal dependent upon the at least one motion signal, adding an evaluated video signal and an evaluated delayed video signal to derive a further evaluated video signal, and subsequently median filtering said further evaluated video signal and said delayed and unevaluated video signal to obtain a motion-adapted filtered output video signal with reduced noise.

13. The method as claimed in claim 12 which further comprises:

deriving at least one further motion signal, deriving from said delayed unevaluated video signal a further delayed unevaluated video signal delayed by one picture period, evaluating the delayed unevaluated video signal and the further unevaluated video signal dependent upon the at least one further motion signal, adding an evaluated delayed video signal and an evaluated further delayed video signal to derive a second further evaluated video signal, averaging the further evaluated video signal and the second further evaluated video signal to derive an averaged evaluated video signal, and median filtering said averaged evaluated video signal.

14. The method as claimed in claim 13 which further comprises median filtering said second further evaluated video signal.

15. The method as claimed in claim 13 wherein said median filtering is performed by a median filter, and further comprising:

selectively applying to said median filter said averaged evaluated video signal and said delayed and unevaluated video signal after averaging thereof.

16. The method as claimed in claim 12 which further comprises; deriving from said video signal and said delayed unevaluated video signal a control signal for blocking the median filtering.

17. A filter circuit for reducing noise in a video signal comprising:

a median filter, and a transversal filter having input means for receiving a video signal and output means coupled to input means of the median filter, wherein said transversal filter comprises;

delay means coupled to the input means to derive second and third video signals with time delays of one picture period and two picture periods, respectively, means coupled to the input means and the delay means for deriving motion signals, multiplier means which receive said video signal and said second and third video signals and having control input means which receive said motion signals, adder means responsive to motion-adapted video signals supplied by said multiplier means so as to produce at its output first and second evaluated and added video signals, multiplexer means having first input means coupled to the output of the adder means and second input means which receive said second video signal, an averaging stage coupled to an output of the multiplexer means, and wherein said median filter has first input means which receive said first and second evaluated and added video signals, further input means coupled to an output of the averaging stage, and an output which supplies motion-adapted filtered output video signals with reduced noise.

18. The noise reducing filter circuit as claimed in claim 17 wherein said motion signal deriving means comprises a motion detector which derives and supplies to the multiplexer means switching signals for switching the multiplexer means.

19. The noise reducing filter circuit as claimed in claim 17 wherein;

said multiplier means comprise first, second, third and fourth multiplier circuits which receive the video signal, the second video signal, the second video signal and the third video signal, respectively, each of said multiplier circuits having a control input which receives a respective motion-adapted signal from the motion signal deriving means, and said adder means comprise said first and second adder stages wherein said first adder stage has first and second inputs coupled to respective outputs of the first and second multiplier circuits and an output coupled to said first input means of the multiplexer means and to said first input means of the median filter, and the second adder stage has first and second inputs coupled to respective outputs of the third and fourth multiplier circuits and an output coupled to said first input means of the multiplexer means and to said first input means of the median filter.

20. The noise reducing filter circuit as claimed in claim 19 wherein said first input means of the median filter comprises first and second input terminals coupled to the outputs of the first and second adder stages, respectively, and said averaging stage comprises an adder circuit with its output coupled to said further input means of the median filter.

* * * * *